United States Patent [19]

Paz

[11] Patent Number: 5,010,709
[45] Date of Patent: Apr. 30, 1991

[54] BENDABLE CHANNEL CONSTRUCTION ELEMENT

[76] Inventor: Felix Paz, 256 Greenway Rd., Lido Beach, N.Y. 11561

[21] Appl. No.: 486,078

[22] Filed: Feb. 28, 1990

[51] Int. Cl.⁵ .............................. E04C 2/38; E04B 1/00
[52] U.S. Cl. ................................... 52/658; 52/98; 52/631; 52/650; 403/205; 403/403
[58] Field of Search .................. 52/98, 293, 631, 650, 52/656, 658; 403/205, 232.1, 401, 403

[56] References Cited

U.S. PATENT DOCUMENTS

| | | | |
|---|---|---|---|
| 959,437 | 5/1910 | Martin | 52/658 |
| 2,393,419 | 1/1946 | Schaat | 52/658 |
| 3,019,866 | 2/1962 | Grabowski . | |
| 3,305,255 | 2/1967 | Henderson | 52/631 |
| 3,867,107 | 2/1975 | Long et al. | 52/658 |
| 3,904,380 | 9/1975 | Smith . | |
| 4,148,164 | 4/1979 | Humphrey . | |
| 4,269,255 | 5/1981 | Nailor et al. | 52/658 |
| 4,597,232 | 4/1986 | Lingemann . | |
| 4,660,339 | 4/1987 | Paz . | |
| 4,704,838 | 11/1987 | Wendt | 52/658 |

*Primary Examiner*—Neill R. Wilson
*Attorney, Agent, or Firm*—Ostrolenk, Faber, Gerb & Soffen

[57] ABSTRACT

A soffit skeleton is constructed of a plurality of transverse frames mounted to a plurality of longitudinal spacer/cap tracks. Each frame is constructed of a metal channel having a U-shaped cross-section and bent into a plurality of end to end sections that are integrally connected at bend line joints. At some of these joints, the sections meeting thereat form interior angles and overlapping portions of each U-arm are secured together. The tracks are also U-shaped metal channels. Each of the latter is provided with equally spaced locating apertures in one arm thereof to receive an individual interior angle forming joint to thereby cap such joint and align said frames in a row in spaced parallel planes. The sections of each arm are separated by transverse notches. Prepunched fastener receiving apertures in the arms adjacent the notches are disposed so that when predetermined apertures are aligned there is a predetermined angle at the joint.

13 Claims, 4 Drawing Sheets

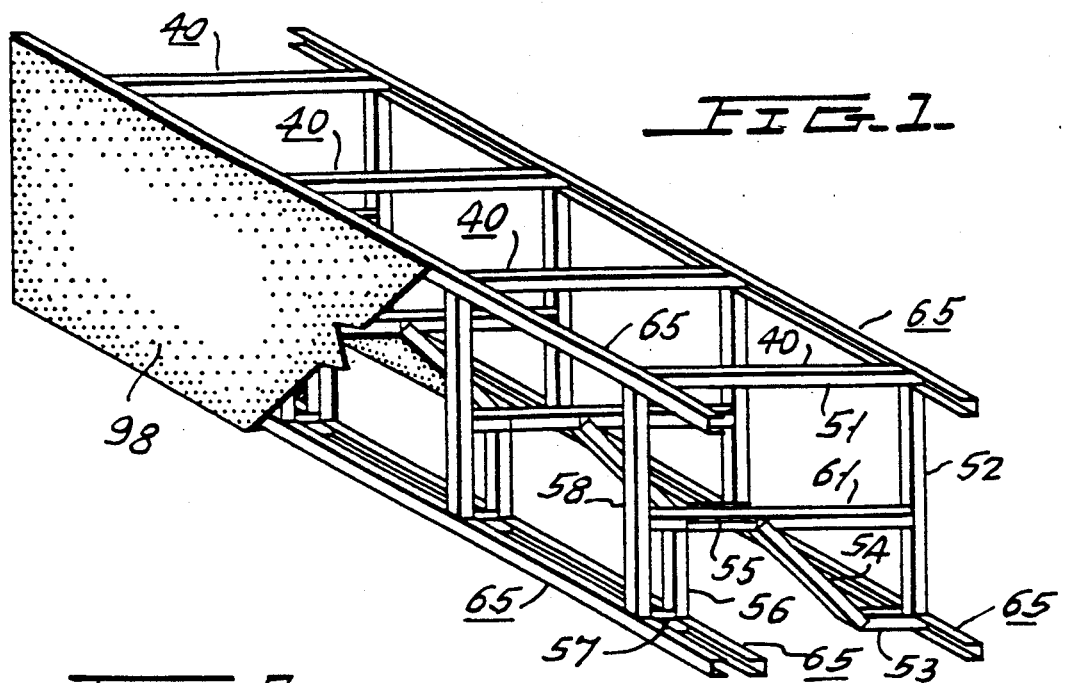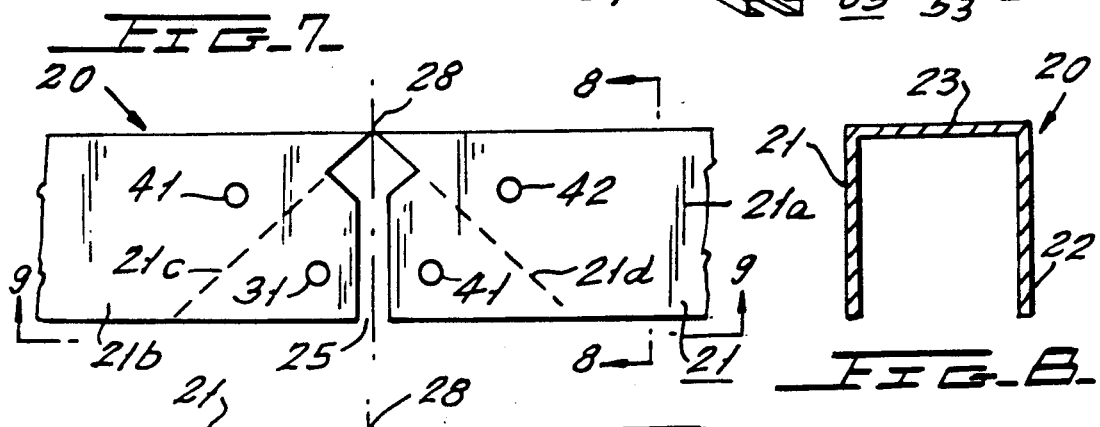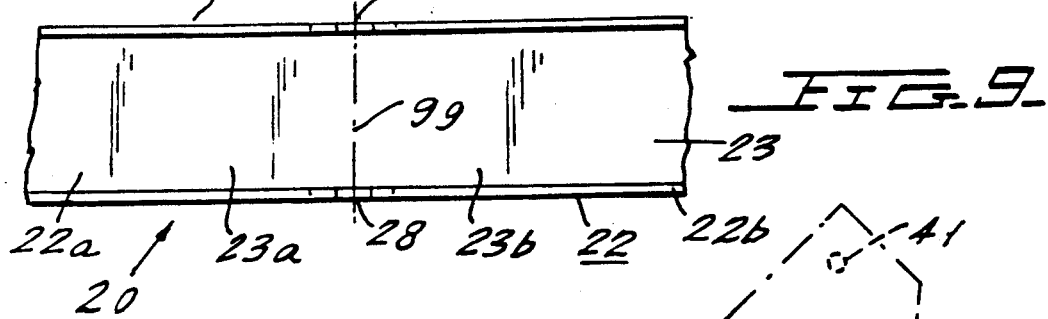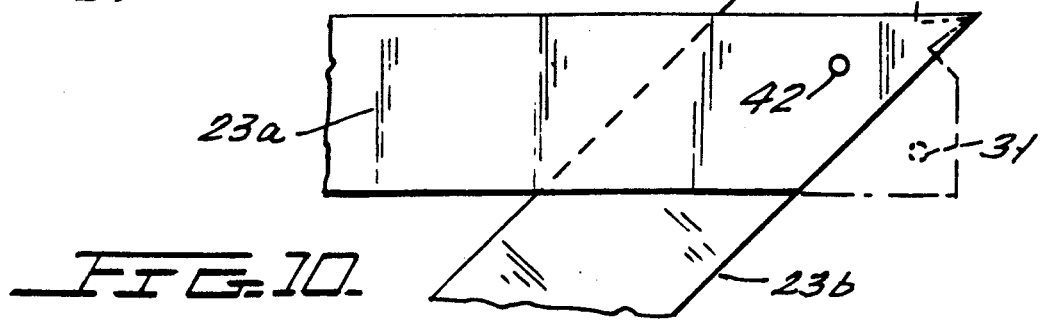

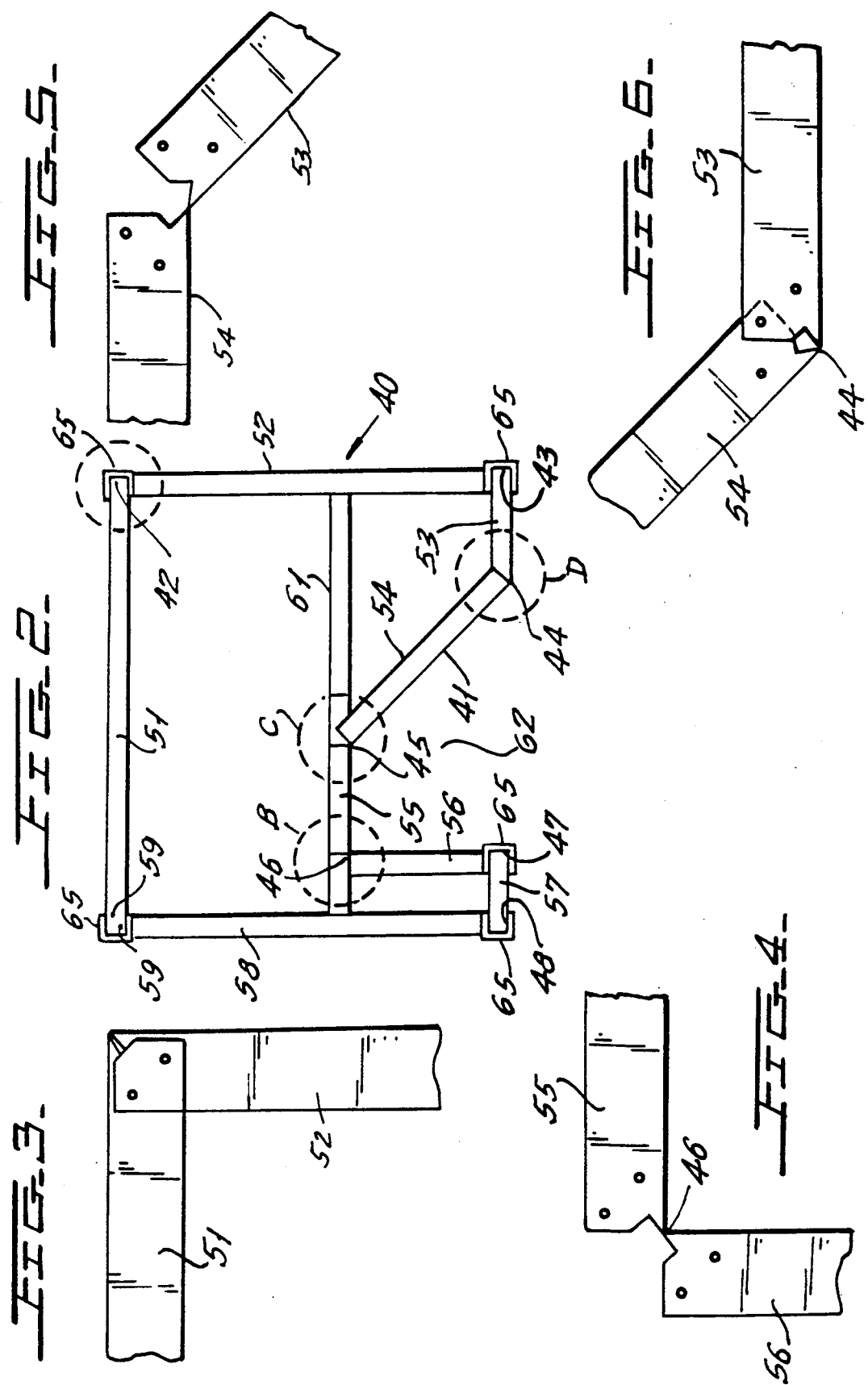

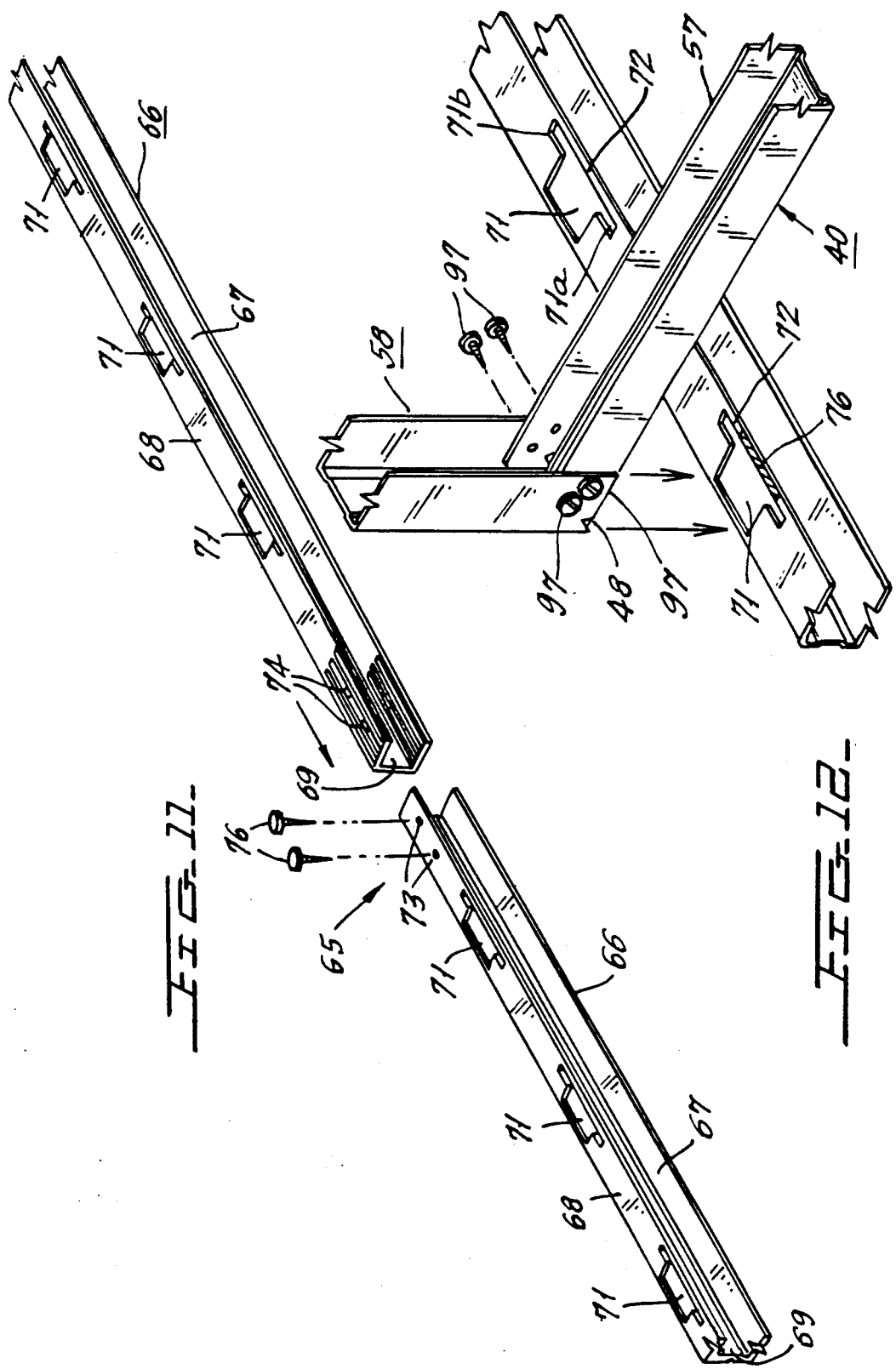

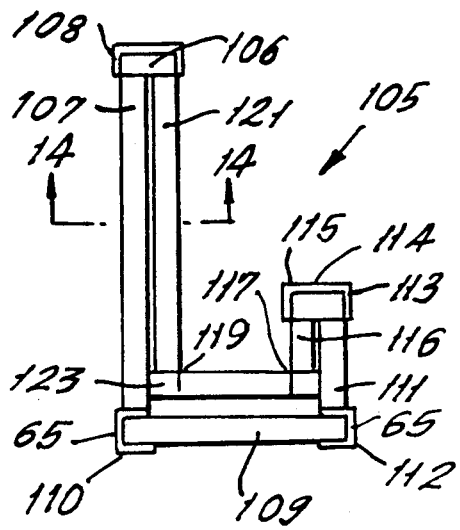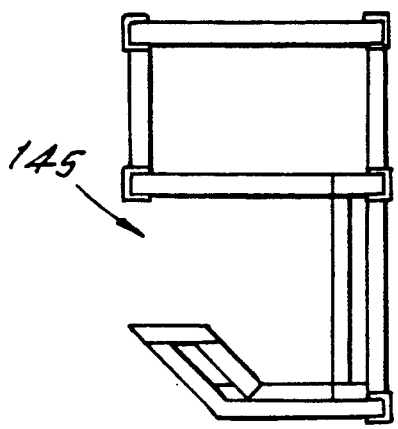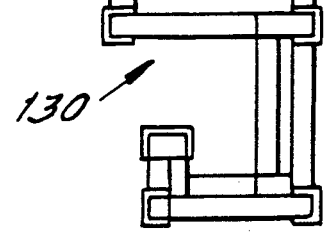

BENDABLE CHANNEL CONSTRUCTION ELEMENT

BACKGROUND OF THE INVENTION

The present invention relates to elongated construction elements and more particularly relates to elements of this type that are useful for building soffits and coves, and the like.

In the prior art the construction of structural framework for architectural shapes, such as soffits and coves, was unnecessarily expensive and/or time consuming because of the vast numbers of elements that had to be assembled in the field. These elements had to be located and identified, and often two men were required for assembling two elements.

In accordance with the instant invention construction of soffits, coves, girders and the like is simplified by utilizing bendable metal channels so that having most joints are formed integrally with both channel sections that meet at the joint. This type of construction is utilized to form a plurality of identical transverse skeleton sections that are aligned with each other and are disposed in spaced parallel planes. A longitudinally extending track to cap the skeleton joints is provided with uniformly spaced apertures to appropriately position the transverse skeleton sections.

The bendable channels are prepunched and prenotched to produce relatively precision angles at each joint even without utilizing special assembling jigs. The longitudinal cap/spacer track is a U-shaped member having one arm prepunched with apertures spaced uniformly therealong. These apertures do not extend to the free end of the arm in which they are punched. However, when a particular one of these apertures is to be utilized as a positioning means the narrow bridge boundary thereof at the free end of the arm is removed by a shears snipped away to provide clearance for a transverse skeleton section.

The skeleton forming channel is of U-shaped cross-section and has generally parallel arms that extend in the same direction from along opposite edges of a web. Both arms are provided with notches and apertures, with the notches permitting the channel to be bent at the joint and alignment of selected apertures being effective to position the channel sections to form a joint of selected angle. Fastening means, such as screws and rivets, are received by aligned apertures to maintain the joint at the angle selected. When interior joints are formed, portions of both arms overlap to rigidify the joint.

SUMMARY OF THE INVENTION

Accordingly, the primary object of the instant invention is to provide a novel construction for the framework of architectural shapes.

Another object is to construct architectural framework shapes by bending U-shaped channels, with parallel arms, along bend lines that are positioned across the channel web and at right angles to the longitudinal axis of the web.

Still another object is to provide novel relatively inexpensive construction for architectural shapes by utilizing sheet metal channels.

Still another object is to provide novel constructions for manufacturing construction coves of various shapes.

These objects as well as other objects of this invention shall become readily apparent after reading the following description of the accompanying drawings in which:

BRIEF DESCRIPTION OF THE DRAWINGS

FIG. 1 is a fragmentary perspective of soffit framework constructed in accordance with teachings of the instant invention.

FIG. 2 is an end view of the framework of FIG. 1 looking in the direction of arrow 2 in FIG. 1.

FIGS. 3, 4, 5 and 6 are enlarged details of the bendable channel member joint locations within the respective circles A, B, C and D of FIG. 2.

FIG. 7 is a side elevation in the joint forming region of a bendable metal channel member constructed in accordance with teaching of the instant invention.

FIG. 8 is a cross-section taken through line 8—8 of FIG. 7 looking in the direction of arrows 8—8.

FIG. 9 is a fragmentary elevation of the channel member of FIG. 7 looking in the direction of arrows 9—9 of FIG. 7.

FIG. 10 is a side elevation of the channel section of FIG. 7 bent to form a 45° inside joint.

FIG. 11 an exploded perspective of adjacent cap/spacer track sections constructed in accordance with teachings of the instant invention.

FIG. 12 is an exploded perspective illustrating the manner in which the track of FIG. 11 is utilized to locate the transverse skeleton sections of FIG. 1.

FIG. 13 is an end view of a transverse skeleton section in the form of a standard cove.

FIG. 14 a cross-section taken through line 14—14 of FIG. 13 looking in the direction of arrows 13—13.

FIGS. 15 and 16 are side elevations of transverse skeleton sections utilized to form a stepped cove and an angled cove, respectively.

FIG. 17 is an exploded side elevation of an exterior joint and a stub for stabilizing the former.

DETAILED DESCRIPTION OF THE DRAWINGS

Now referring to the Figures and more particularly to FIGS. 7 through 9 which illustrate elongated sheet metal channel 20 of U-shaped cross-section formed by spaced parallel arms 21, 22 and web 23 that extends between arms 21, 22 at one end thereof. Each of the arms 21, 22 is provided with at least one notch 25 that extends from web 23 for the full height of arms 21, 22 and is open at the end remote from web 23. Notch 25 resembles the shape of an arrow having a diamond shaped head 26 at one end of shaft 27 with the latter being transverse to the longitudinal axis of arms 21, 22. The free end of head 26 is V-shaped being slightly more than 90° and having an apex at web 23. Screw receiving apertures 31, 32 are formed in the portion of each arm 21, 22 to the left of notch 25 in FIG. 7 and the portions of arm 21, 22 to the right of notch 25 in FIG. 7 are provided with two screw receiving apertures 41, 42.

With web 23 bent along a transverse bend line extending between apiece 28 of aligned notches 25 in arms 21 and 22, when apertures 31, 41 are aligned web sections 23a, 23b form an included or inside angle of 135° (FIG. 6). With apertures 41 and 32 aligned the included angle is 90° (FIG. 3), and with apertures 42 and 32 aligned the included angle is 45° (FIG. 10). When the included angle of 90° is formed apertures 31 and 42 are also aligned. In order to achieve the 45° bend it is necessary to cut away portions of arm sections 21a, 21b that include apertures 31, 41. For this purpose arm portions 21a, 21b are marked with respective lines 21c, 21d. To maintain a selected interior angle relationship between web sections 22a and 23b that meet at bend line 99. An individual fastener, preferably a sheet metal screw 97 (FIG. 12) or a rivet (not shown), extends through each pair of aligned apertures. It should now be apparent that when channel 20 is bent to form interior angles there are portions of arm sections 21a, 22a that overlap portions of respective arm sections 21b, 22b. Overlapping of arm sections 21a, 21b and 22a, 22b is enabled because channel 20 is constructed of relatively thin gauge sheet metal that is bendable to the extent required.

Now referring more particularly to FIGS. 1 and 2 which illustrate generally rectangular soffit frame 35 which is adapted to shape and support skin 98, only a portion of which is shown. Frame 35 includes a plurality of essentially identical transverse skeleton sections 40 each constructed principally of bendable channel 41 having the same cross-section as channel 20 of FIG. 7 and having a plurality of notches 25 cut in the arms thereof to establish locations for transverse bend lines 42–48. Channel 41 includes upper horizontal run 51 connected integrally with right vertical run 52 at bend line 42 to form a right angle. The lower end of vertical run 52 is joined integrally with short lower horizontal run 53 at bend line 43 to form an interior right angle. The left end of run 53 is integrally connected at bend line 44 to diagonal run 54 which extends upward forming a 135° interior angle at bend line 44. The left or upper end of diagonal run 54 is integrally connected at bend line 45 with short intermediate horizontal run 55 to form a 135° exterior angle. Run 55 is joined integrally with short vertical run 56 at bend line 46 and forms a 90° exterior angle therewith. The lower end of vertical run 56 is connected integrally with the right end of short lower horizontal run 57 to form an included angle of 90° at bend line 47. The left end of horizontal run 57 is joined integrally with the lower end of left vertical run 58 to form a 90° interior angle at bend line 48. The upper end of run 58 meets the left end of upper horizontal run 51, where they overlap and are connected together by a plurality of screws 59, 59.

In a manner previously explained, interior joints at bend lines 42, 43, 47 and 48 are maintained at selected angular settings by screws 97 that extend through aligned apertures in the arm sections of channel 41. Horizontal rib 61 of U-shaped cross-section extends between the arms of run 55 and has its opposite ends extend into and connected to vertical runs 52 and 58. It should now be apparent to those skilled in the art that runs 54, 55 and 56 will be used to define a longitudinal recess 62 open at the bottom of soffit 35 to house lighting fixtures (not shown) or other devices of appropriate size that should be concealed partially.

Interior right angles at each of the bend lines 42, 43, 47 and 48, as well as the joint where runs 51 and 58 meet, are capped by an individual track 65. The construction of track 65 and its connection with transverse skeleton section 40 is seen most clearly with particular reference to FIGS. 11 and 12.

That is, track 65 consists of a plurality of channeled section 66 joined end-to-end. Each channel section 66 is of U-shaped cross-section having spaced parallel arms 67, 68 joined by web 69. Arm 68 is provided with a plurality of equally spaced locating apertures 71 that extend from web 69 almost the full width of arm 68. A narrow bridge 72 at the free edge of arm 68 normally forms a boundary defining the side of aperture 71 remote from web 69. The right end of arm 68 is provided with a pair of screw apertures 73 and the left end of arm 68 is provided with a pair of screw apertures 74. In order to have uniform spacing between all apertures 71 in the complete run of track 65, with the left end of right track section 66 in FIG. 10 slipped between arms 67, 68 at the right end of the left track section in FIG. 10, when both screw apertures 73 are aligned with both screw apertures 74 the spacing between the rightmost positioning aperture 71 in the left track section 66 and the leftmost positioning aperture 71 in the right track section 66 will be equal to the spacing between the remaining apertures 71. Screws 76 received by screw apertures 73, 74 secure track section 66, 66 together. Typically, each track section 66 is eight feet long and the spacing between apertures 71 is eight inches.

In order to stabilize the longitudinal position of transverse skeleton section 40 hatched portion 76 of bridge is cut away so that the side of locating aperture 71 remote from web 69 is open. This permits the joint region at bend line 48 to be slipped into aperture 71 until bend line 68 meets the intersection of web 69 and arm 67. At this point, web 58a of run 58 is adjacent the inside surface of web 69 and web 57a of run 57 is adjacent the inside surface of arm 67. Screws 77 extending through webs 69 and 58a and other screws (not shown) extending through arm 67 and web 57a mechanically secure transverse section 40 to cap/spacer track 65. The other tracks 65 are connected in a similar manner to transverse section 40 at the joint regions of bend lines 42, 43, 47 and right angle connection 59.

Except for extremely long runs of frame 35, it is intended that the entire frame be assembled at ground level. The complete frame 35 is then raised and secured in final position by ceiling hangers, wall brackets and/or screw-type fasteners that engage wall studs and/or rafters.

Longitudinal extensions 71a and 71b of each aperture 71 adjacent bridge 72 permit track 65 to be used for spacing of channel (not shown) of essentially the same cross-section as main channels 12 in my U.S. Pat. No. 4,660,339 issued Apr. 28, 1987 for a Wall System.

FIGS. 13, 15 and 16 illustrate different cove configurations that may readily be constructed by utilizing U-shaped bendable channels having essentially parallel arms. The standard cove 105 (FIG. 13) is constructed by bending a U-shaped channel having parallel arms with appropriately located transverse cuts or notches so that short horizontal run 106 is integrally joined with long vertical run 107 at bend line 108. The lower end of run 107 is integrally joined with lower horizontal run 109 at bend line 110, and the right end of run 109 is integrally joined with short vertical run 111 at bend line 112 and the upper end of run 111 is joined at bend line 113 to the right end of short lower horizontal run 114. The left end of the latter is integrally joined at bend line 115 to the upper end of short vertical run 116 that is integrally joined at bend line 117 to horizontal run 118 which extends immediately above run 109. The left end of run 118 is integrally joined at bend line 119 to the lower end of vertical run 121 that extends upward adjacent to run 107. The upper end of the latter is recessed between the arms of run 106 at the right end thereof where runs 121 and 106 are screwed together. The exterior joints at bend lines 117 and 119 are stabilized by auxiliary transverse member 123 that extends between the downwardly facing arms of run 118. The ends of member 123 extend between the arms of the respective runs 111 and 107.

The concepts of the embodiment in FIG. 13 are used to construct stepped cove 130 of FIG. 15 and angled cove 145 of FIG. 16. That is, in the embodiment of FIG. 13 a single channel is bent so that all of the outside runs are integral with each other. This is also true of coves 130 and 145.

Now referring more particularly to FIG. 17, in order to stabilize outside bends (those in which channel arm sections do not overlap) a stub in the form of a complementary internal Joint is inserted between the channel arms at the outside bend. For example, stub 150 provides a 135° inside bend constructed the same way as the joint at bend line 44 (FIG. 6). Stub 150 nests between the arms of runs 151 and 153 joined at bend lines and defining an outside joint or open corner, as at bend line 45 (FIG. 5). Screws (not shown) driven through apertures 41, 42 of run 152 engage both arms of stub 151 to secure the latter to runs 151, 152.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A construction element comprising:
   an elongated channel having a generally U-shaped cross-section that includes a web, parallel firs and second arms each having a front end and rear end, said arms at their front ends being connected to said web and extending rearward from opposite ends of said web;
   said channel being bendable to define integrally formed first and second sections that are disposed at a selected angle with respect to each other and connected in end to end relation at a transverse bend line in said web;
   said channel prior to bending thereof at said bend line having said first and second sections in axial alignment;
   prior to bending of said channel at said bend line, said first and second arms each having a notch therein extending between said front and rear ends and including a V-section having its apex disposed at as front end;
   said bend line extending between the apiece of said V-sections prior to bending of said channel at said bend line, each of said arms having first and second aperture means disposed on opposite sides of said notch;
   with said channel sections being disposed at said selected angle said first aperture means being aligned with said second aperture means;
   said first and second aperture means of said first arm, when aligned, being adapted to receive a fastening means to maintain said channel sections disposed at said selected angle;
   said first and second aperture means of said second arm, when aligned, being adapted to receive fastening means to maintain said channel sections disposed at said selected angle;
   said front end and said rear end being spaced by a distance that is comparable to the length of said transverse bend line; and
   each of said V-sections extending toward said rear end for a distance that is substantially less than the distance between said front end and said rear end.

2. A structural member as set forth in claim 1 in which each of the notches also includes a relatively narrow section that extends rearward from said V-section to said rear end;
   portions of said first arms overlapping with each other when said channel sections are disposed at said selected angle; and
   portions of said second arms overlapping with each other when said channel sections are disposed at said selected angle.

3. A structural member as set forth in claim 2 in which for each of said arms said first aperture means comprises a plurality of spaced fastener means receiving apertures that are disposed to be selectively aligned and cooperate with said second aperture means to establish first and second predetermined angular positions between said first and second channel sections.

4. A structural member as set forth in claim 3 in which for each of said arms said second aperture means comprises a plurality of spaced fastener means receiving apertures that are disposed to be selectively aligned and cooperate with said apertures of said first aperture means to establish said first and said second predetermined angular positions between said channel sections as well as a third predetermined angular position between said channel sections.

5. A construction frame comprising at least one longitudinal member and a plurality of aligned transverse skeleton sections secured to said longitudinal member at spaced points therealong, each of said skeleton sections including:
   an elongated channel having a generally U-shaped cross-section that includes a web, parallel first and second arms each having a front end and rear end, said arms at their front ends being connected to said web and extending rearward from opposite ends of said web;
   said channel being bendable to define integrally formed first and second sections that are connected at a first joint where they are disposed at a selected angle with respect to each other and connected in end to end relation at a transverse bend line in said web;
   said channel prior to bending thereof at said bend line having said first and second sections in axial alignment;
   prior to bending of said channel at said bend line, said first and second arms each being divided into first and second sections by a slit extending from the web to the free edge of said arm opposite said web, and said bend line extending between said slits;
   first fastening means securing together overlapping portions of the first and second sections of said first arm;
   second fastening means securing together overlapping portions of the first and second sections of said second arm.

6. A construction frame as set forth in claim 5 in which the first joint of a first of said aligned transverse skeleton sections is received by a prepunched locating aperture in said longitudinal member.

7. A construction frame as set forth in claim 6 in which said longitudinal member is of U-shaped cross-section with a pair of arms extending from opposite ends of a web;

said locating aperture being in one arm of said pair of arms and extending to the free edge of the said one arm;

said first section of said channel extending from the inside surface of the other arm of said pair of arms and through said locating aperture;

said second section of said channel extending from the inner surface of the web of the longitudinal member across the inside surface of the other arm and projecting across the free edge thereof.

8. A construction frame as set forth in claim 7 in which said longitudinal member provides a cover over said first joint.

9. A construction frame as set forth in claim 8 in which said aligned transverse skeleton sections include additional skeleton sections that are essentially identical to said first skeleton section and each of the additional skeleton sections being positioned by an individual locating aperture in said one arm.

10. A construction frame as set forth in claim 5 in which the first and second arms of the elongated channel of the skeleton section is divided into additional sections by additional slits that extend from the web of the channel of the skeleton section to said free edge;

said channel of the skeleton section being bent along additional bend lines parallel to said bend line to form additional channel sections that are integral with the first and second channel sections;

said additional channel sections and said first and second channel sections being arranged in a closed loop configuration 11. A frame section including:

an elongated channel having a generally U-shaped cross-section that includes a web, parallel first and second arms each having a front end and rear end, said arms at their front ends being connected to said web and extending rearward from opposite ends of said web;

said channel being bendable to define integrally formed first and second sections that are connected at a first joint where they are disposed at a selected angle with respect to each other and connected in end to end relation at a transverse bend line in said web;

said channel prior to bending thereof at said bend line having said first and second sections in axial alignment;

prior to bending of said channel at said bend line, said first and second arms each being divided into first and second sections by a slit extending from the web to the free edge of said arm opposite said web, and said bend line extending between said slits;

said selected angle being an external angle formed by bending said web in a direction to open said slit;

a bendable stub channel having a generally U-shaped cross-section of essentially the same size as that of said elongated channel; said stub channel including a stub web, parallel first and second stub arms projecting forward from opposite ends of said stub web;

prior to bending of said stub channel, each of said stub arms being divided into first and second sections by a slit that extends from said stub web to the free edge of said stub arm opposite said stub web with a stub bend line extending between said slits in said stub arms;

said stub channel being bent at said stub bend line to define an internal angle, with portions of said first and second sections of said first stub arm overlapping each other and portions of said first and second sections of said second stub arms overlapping each other;

said internal angle being substantially the same as said selected angle;

fastening means securing together said overlapping sections of said first stub arm and fastening means securing together said overlapping sections of said second stub arm;

said free edges of said stub arms being adjacent opposite edges said web and said free edges of said arms being adjacent opposite edges of said stub web;

fastening means securing both sections of said first arm to both sections of said first stub arm and fastening means securing both sections of said second arm to both sections of said second stub arm.

12. A construction element comprising:

an elongated channel having a generally U-shaped cross-section that includes a web, parallel first and second arms each having a front end and rear end, said arms at their front ends being connected to said web and extending rearward from opposite ends of said web;

said channel being bendable to define integrally formed first and second sections that are disposed at a selected angle with respect to each other and connected in end to end relation at a transverse bend line in said web;

said channel prior to bending thereof at said bend line having said firs and second sections in axial alignment;

prior to bending of said channel at said bend line, said first and second arms each having a notch therein extending between said front and rear ends and including a V-section having its apex disposed at said front end;

said bend line extending between the apiece of said V-sections prior to bending of said channel at said bend line, each of said arms having first and second aperture means disposed on opposite sides of said notch;

with said channel sections being disposed at said selected angle said first aperture means being aligned with said second aperture means;

said first and second aperture means of said first arm, when aligned, being adapted to receive a fastening means to maintain said channel sections disposed at said selected angle;

said first and second aperture means of said second arm, when aligned, being adapted to receive fastening means to maintain said channel sections disposed at said selected angle;

each of the notches also including a relatively narrow section that extends rearward from said V-section to said rear end;

portions of said first arms overlapping with each other when said channel sections are disposed at said selected angle;

portions of said second arms overlapping with each other when said channel sections are disposed at said selected angle;

for each of said arms said first aperture means comprising a plurality of spaced fastener means receiving apertures that are disposed to be selectively aligned and cooperate with said second aperture means to establish first and second predetermined angular positions between said first and second channel sections.

13. A structural member as set forth in claim 12 in which for each of said arms said second aperture means comprises a plurality of spaced fastener means receiving apertures that are disposed to be selectively aligned and cooperate with said apertures of said first aperture means to establish said first and said second predetermined angular positions between said channel sections as well as a third predetermined angular position between said channel sections.

* * * * *